United States Patent [19]
Haslbeck

[11] Patent Number: 5,997,823
[45] Date of Patent: Dec. 7, 1999

[54] PROCESSES AND APPARATUS FOR REMOVING ACID GASES FROM FLUE GAS

[75] Inventor: John L. Haslbeck, Pittsburgh, Pa.

[73] Assignee: Noxso Corporation, Pittsburgh, Pa.

[21] Appl. No.: 08/912,319

[22] Filed: Aug. 18, 1997

[51] Int. Cl.$^6$ .................................................. B01D 50/00
[52] U.S. Cl. .................... 422/169; 422/168; 422/171; 422/143; 422/145; 422/216
[58] Field of Search ..................................... 422/168–171, 422/216–217, 139, 143, 145; 423/244.07, 244.08

[56] References Cited

U.S. PATENT DOCUMENTS

| | | | |
|---|---|---|---|
| 4,548,797 | 10/1985 | Sauer et al. .......................... | 423/240 R |
| 4,555,390 | 11/1985 | Bhatia ................................. | 423/244.07 |
| 4,562,054 | 12/1985 | Bhatia ................................. | 423/244.05 |
| 4,604,269 | 8/1986 | Yoon .................................... | 423/244.07 |

*Primary Examiner*—Hien Tran
*Attorney, Agent, or Firm*—Doepken Keevican & Weiss

[57] ABSTRACT

Processes and apparatus for removing acid gases from hot flue gases utilizing a slurry consisting of water, calcium chloride and at least one absorbing agent selected from a group consisting of calcium oxides, magnesium oxides, calcium hydroxides, magnesium hydroxides, alkali metal oxides, alkali metal hydroxides, and alkali metal carbonates, introducing the slurry into the rising stream of hot flue gas to absorb the acid gas into the water and thereafter to react the absorbed acid gas with the absorption agent and thereafter to evaporate the water to produce dry solids comprising reaction products and unreacted absorption agents suspended in the flue gas. The calcium chloride reduces the water vapor pressure of the slurry to reduce the rate at which the water evaporates so as to increase the rate at which the acid gas is absorbed into the water before the water evaporates. The dry solids include relatively large, relatively small, and intermediate sized dry solids with the relatively large and intermediate dry solids being first removed from the flue gas, the relatively large sized dry solids being discharged as waste, and the intermediate sized dry solids being recycled for reuse in reacting with the acid gas and with the relatively small sized dry solids being removed second from the flue gas and the relatively small sized dry solids recycled for reuse in reaction with the acid gases.

7 Claims, 2 Drawing Sheets

PROCESSES AND APPARATUS FOR REMOVING ACID GASES FROM FLUE GAS

The present invention relates to processes and apparatus for removing acid gases such as sulfur oxides, hydrogen chloride, hydrogen fluoride, hydrogen bromide, and the like, from hot flue gases such as hot flue gases emanating from coal or oil combustion.

U.S. Pat. No. 4,555,390 entitled METHOD FOR REMOVING SULFUR OXIDES FROM HOT FLUE GASES, patented Nov. 26, 1985, Vinay K. Bhatia inventor, discloses a method of removing sulfur oxides and other acid gases from hot flue gases by dispersing and suspending an absorption agent in water and contacting a rising stream of hot flue gas with the absorption agent and water to cause the sulfur oxides and other acid gases to be absorbed on and reacted with the absorption agent in the presence of evaporating water producing a dry powder which is separated from the flue gas in a particle precipitator and partially recirculated to a reaction chamber in which the hot flue gas is contacted by the absorption agent and water. More particularly, the present invention is an improvement on the invention disclosed in this patent.

SUMMARY OF THE INVENTION

Processes and apparatus for removing acid gases, such as sulfur oxides, from hot flue gases utilizing a slurry consisting of water, calcium chloride and at least one absorbing agent selected from a group consisting of calcium oxides, magnesium oxides, calcium hydroxides, magnesium hydroxides, alkali metal oxides, alkali metal hydroxides, and alkali metal carbonates and introducing the slurry into the rising stream of hot flue gas to absorb the acid gas into the water and thereafter to react the absorbed acid gas with the absorption agent and thereafter to evaporate the water to produce dry solids comprising reaction products and unreacted absorption agents suspended in the flue gas. The calcium chloride reduces the water vapor pressure of the slurry to reduce the rate at which the water evaporates so as to increase the rate at which the acid gas is absorbed into the water before the water evaporates. The dry solids include relatively large, relatively small, and intermediate sized dry solids with the relatively large and intermediate dry solids being first removed from the flue gas, the relatively large sized dry solids being discharged as waste, and the intermediate sized dry solids being recycled for reuse in reacting with the acid gas and with the relatively small sized dry solids being removed second from the flue gas and the relatively small sized dry solids recycled for reuse in reaction with the acid gases.

DESCRIPTION OF THE PREFERRED EMBODIMENT

Figure 1:
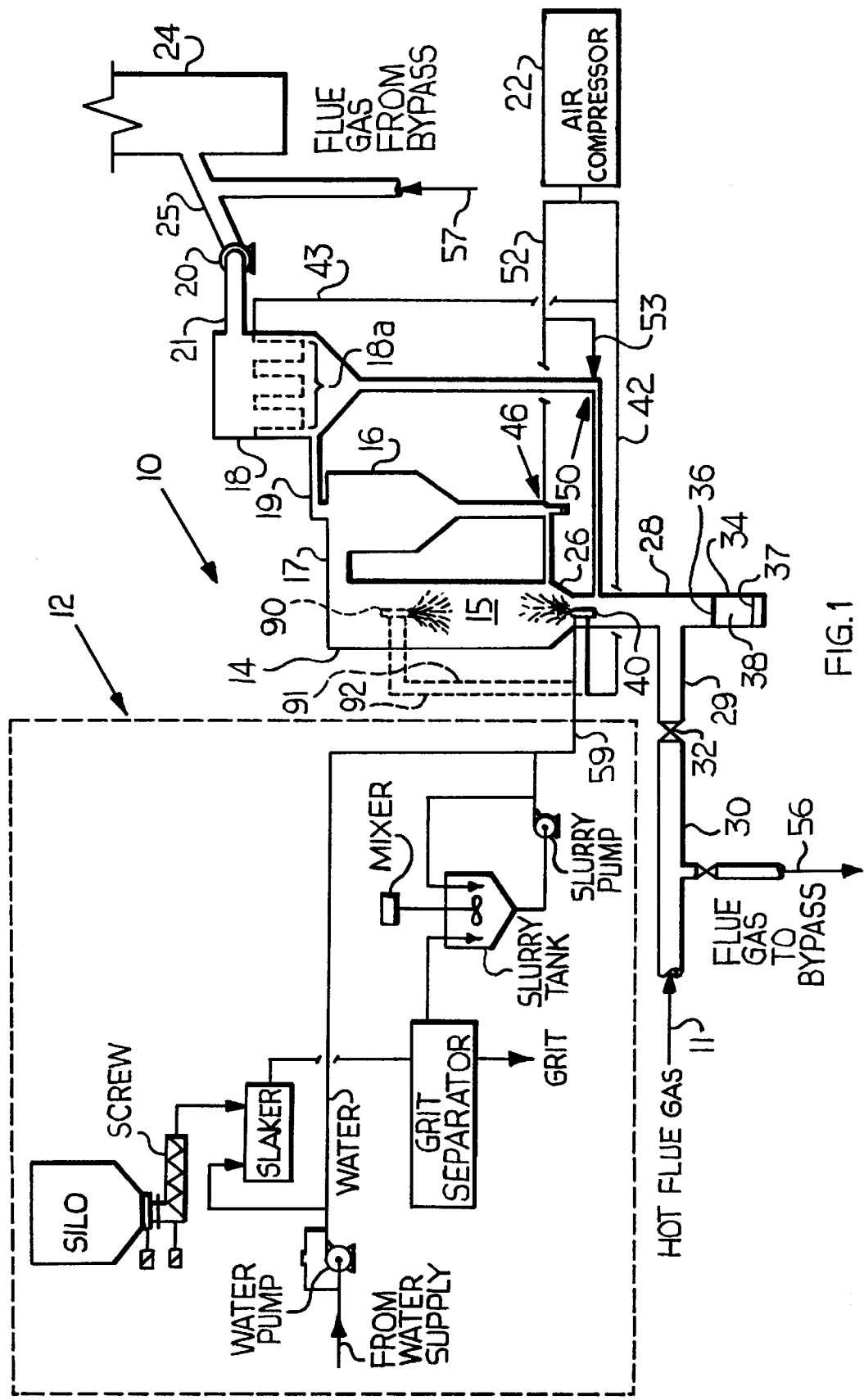
FIG. 1 is a diagrammatical illustration of apparatus embodying the present invention and for practicing the processes of the present invention.

Referring now to FIG. 1, apparatus embodying the present invention and particularly useful for practicing the process of the present invention is shown and indicated by general numerical designation 10. Generally, the present invention is for removing the above-noted acid gases from hot flue gas such as the hot flue gas indicated in the lower portion of FIG. 1 by numerical designation 11. Apparatus 10 includes the apparatus included within the dashed outline indicated by general numerical designation 12 and which apparatus 12 is for producing a slurry consisting of calcium chloride and at least one absorption agent selected from the group consisting of calcium oxides, magnesium oxides, calcium hydroxides, magnesium hydroxides, alkali metal oxides, alkali metal hydroxides and alkali metal carbonates, and water. The slurry is about 0.1% by weight calcium chloride, about 15% by weight one or more of the selected absorption agents and the balance water. Such lime slurry producing apparatus is commercially available from ZMI/Portec Chemical Processing Group of 1102 Egret Drive, P.O. Box 274, Sibley, Iowa 51249 and CHEMCO, P.O. Box 589, 105 Commerce Boulevard, Lawrence, Pa. 15055.

Apparatus 10 may further include a vertically oriented cylinder or reactor 14 providing an internal reaction chamber or zone 15, a separating cyclone 16 connected to the top of the cylinder or reactor 14 by a duct 17, a baghouse 18 housing including a plurality of filter bags 18a and connected to the top of the separating cyclone 16 by duct 19, an induced draft fan 20 connected to the top portion of the baghouse 18 by a duct 21, and an air compressor 22. The output of the induced draft fan 20 is connected to a stack 24 by the duct 25; the stack 24 is not a part of the present invention. The induced draft fan 20 may be any one of several suitable commercially available such fans and is used to draw the hot flue gas 11 through the reaction chamber or zone 15 of the cylinder 14, through the separating cyclone 16 and through the baghouse 18. As is further shown in FIG. 1, the bottom portion 26 of the cylinder 14 providing the reaction chamber or zone 15 is of divergent frusto-conical shape. Extending downwardly from the cylinder portion 26, and in flow communication therewith, is a duct 28 which is in flow communication with a horizontally disposed duct 29. The duct 29 is in flow communication with a duct 30 through an isolation damper 32; the duct 30 and damper 32 are not a part of the present invention. A portion of the duct 28 indicated by numerical designation 34 extends downwardly below the duct 29 and is provided with an upper slide gate shown diagrammatically and indicated by numerical designation 36 and a bottom slide gate shown diagrammatically and indicated by numerical designation 37; these slide gates provide a receiving chamber 38 therebetween. A suitable nozzle 40 is suitably mounted internally of the duct 28 at the mouth or entrance into the frusto-conical bottom cylinder portion 26.

The output from the air compressor 22 may be divided into a high pressure air stream and a low pressure air stream. The high pressure air stream is connected to the nozzle 40 by the line 42 and to the baghouse 18 by the line 43.

Referring again to FIG. 1, the lower portion of the cyclone 16 may be provided with an L-valve indicated by general numerical designation 46 which is described in detail below and shown in detail in FIG. 2. The lower portion of the baghouse 18 is provided with an L-valve indicated by general numerical designation 50 which is described in detail below and shown in detail in FIG. 3. The low pressure stream from the air compressor 22 is connected to the L-valve 46 by the line 52 and to the L-valve 50 by the line 53.

In the event that it is desired to bypass an installation of the apparatus 10 of the present invention, such an installation may be bypassed by operating the isolation damper 32 to cause the incoming flue gas 11 to go directly to the stack 24 as indicated by the arrows 56 and 57 in FIG. 1.

Referring again to FIG. 1 and to apparatus 12 for producing the above-noted slurry, calcium chloride and at least one of the above-noted absorption agents are introduced into the silo in solid or powder form and are advanced into the slaker by the screw where they are dissolved into water introduced in the slaker by the water pump to produce the slurry. The slurry from the slaker passes through the grit separator to remove grit and undissolved solids and then passes into the slurry tank. The slurry pump circulates the slurry through the slurry tank in a loop as shown to provide further mixing of the solids with the water by the mixer and from the loop the slurry is passed to the nozzle 40 through the line 59. As noted above, the stream of high pressure air from the air compressor 22 is fed into the nozzle 40 where the slurry is atomized into fine droplets as shown diagrammatically at the lower portion of the reaction chamber 15. The hot flue gas 11 under the influence of the induced draft fan 20 becomes a rising stream of hot flue gas flowing upwardly through the reaction chamber or zone 15 where the slurry, atomized by the nozzle 40, is introduced co-currently into and contacts the rising stream of hot flue gas. The acid gas is absorbed into the water and the acid gas absorbed into the water reacts with the absorption agent, or agents, contained in the slurry and the heat of the flue gas causes the water to evaporate whereby dry solids comprising reaction products and unreacted absorption agent are produced and are suspended in the upwardly flowing hot flue gas. The calcium chloride contained in the slurry reduces the water vapor pressure of the water in the slurry in the reaction zone 15 which reduces the rate at which the water evaporates in the reaction zone so as to increase the rate at which the acid gases are absorbed into the water before reacting with the absorption agent, or agents. The dry solids include relatively large, relatively small, and intermediate sized dry solids. Under the continued influence of the induced draft fan 20, the hot flue gas containing the dry solids flows through the duct 17 and into the separator cyclone 16 where the relatively large and intermediate dry solids are separated from the hot flue gas. The L-valve 46, as described in detail below, separates the relatively large and intermediate sized dry solids, recycles the intermediate sized dry solids into the reaction zone 15, and discharges the relatively large sized dry solids as waste. The hot flue gas having the relatively small sized dry solids contained therein exits the top of the separating cyclone 16 under the influence of the induced draft fan 20 and flows into the baghouse 18 where the relatively small sized dry solids are separated and recycled to the reaction zone 15 by the L-valve 50 as described in detail below. The hot flue gas having the dry solids removed therefrom flows through the ducts 21 and 25 under the further influence of the induced draft fan 20 and exits the stack 24 to the atmosphere.

Figure 2:
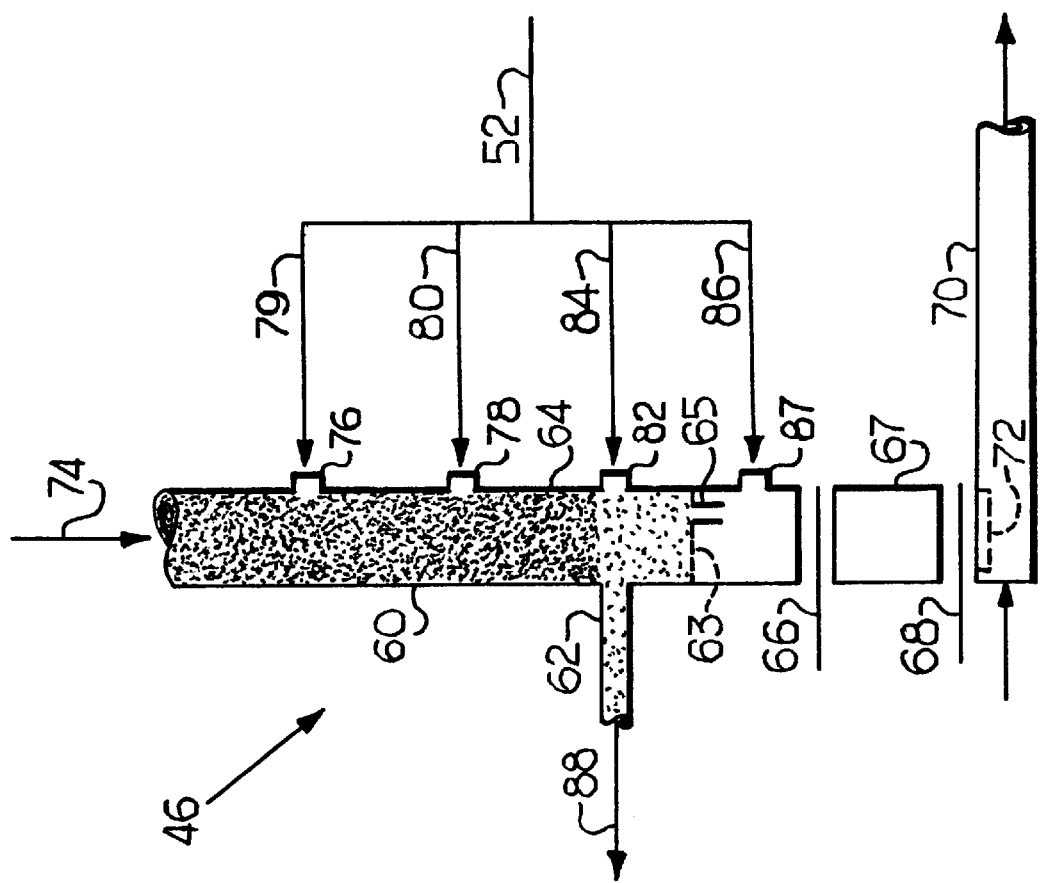
FIG. 2 is a vertical diagrammatical illustration of an L-valve according to the present invention particularly useful for separating relatively large sized dry solids from intermediate sized dry solids.

Referring now to FIG. 2, the L-valve 46 shown in FIG. 1, and referred to generally above, is shown in detail. As is known to those skilled in the art, an L-valve is a device used to control the flow or movement of solids, or particles, by non-mechanical means using compressed air as the solids conveying or motive force. As shown in FIG. 2, the L-valve 46 of the present invention includes a downcomer 60 in the form of a vertically disposed hollow cylindrical pipe which is in flow communication with a horizontally disposed hollow cylindrical pipe 62. The downcomer 60 includes a lower extended section 64 extending downwardly below the horizontal pipe 62 and which extended section 64 is used to provide a fluidized bed of dry solids namely the above-noted relatively large and intermediate sized dry solids. The lower extended section 64 is provided internally with a gas distributor 63 through which a downcomer 65 extends downwardly and vertically. The L-valve 46 further includes a first slide gate valve, indicated diagrammatically and identified by numerical designation 66, disposed below the lower extended section 64 of the downcomer 60, a hollow cylindrical receiving pipe 67 disposed below the slide gate valve 66, a second slide gate valve shown diagrammatically and indicated by numerical designation 68 disposed below the receiving pipe 67, and a horizontally disposed hollow cylindrical conveying pipe 70 provided in its leftward upper portion, as shown in dashed outline in FIG. 2, with an opening 72 disposed under the second slide gate 68. Generally, the bottom of the lower extended section 64 of the downcomer 60 is open, the top of the receiving pipe 67 is open, and the slide gate valve 66 is used to alternately close the bottom of the extended section 64 and the top of the receiving pipe 67 and to open the bottom of the lower extended section 64 and the top of the receiving pipe 67 to place the lower extended section 64 and the receiving pipe 67 in flow communication. Similarly, and generally, the bottom of the receiving pipe 67 is open, and the slide gate valve 68 is operated to alternately close the bottom of the receiving pipe and to open the bottom of the receiving pipe to place the receiving pipe 67 in flow communication with the opening 72 formed in the conveying pipe 70. The slide gates 66 and 68, and the slide gates 36 and 37 shown in FIG. 1, are commercially available slide gates available, for example, from Red Valve Company, Inc., P.O. Box 548, 700 North Bell Avenue, Pittsburgh, Pa. 15106 and Velan Valves, P.O. Box 7517, Elgin, Ill. 60121.

The relatively large and intermediate sized dry solids from the cyclone 16, FIG. 1, enter the downcomer 60 by gravity flow from the separating cyclone 16 (FIG. 1) as indicated by the arrow 74; these relatively large intermediate sized dry solids are shown diagrammatically in the downcomer 60 by the small circles. The downcomer 60 is provided with a pair of air inlets 76 and 78 through which aeration air indicated by the arrows 79 and 80 enters the downcomer 60. The aeration air 79 and 80 is provided by the stream of low pressure air from the air compressor 22 (FIG. 1) through the pipe 52 (FIGS. 1 and 2). The aeration air 79 and 80 aerates the relatively large and intermediate sized dry solids flowing downwardly through the downcomer 60 by gravity to cause the solids to flow continuously downwardly through the downcomer and to prevent blockages or bridges of these dry solids from being formed in the downcomer 60. The downcomer 60 is provided with an air inlet 82 through which conveying air indicated by the arrow 84 enters the downcomer 60 opposite the horizontal cylindrical pipe 62; the conveying air 84 is also provided by the stream of low pressure air from the air compressor 22 (FIG. 1) over the pipe through the line 52 (FIGS. 1 and 2). Fluidization air indicated by the arrow 86 enters the lower extended section 64 of the downcomer 60 through the air inlet 87; the fluidizing air also is provided by the stream of low pressure air from the air compressor 22 (FIG. 1) over the line 52 (FIGS. 1 and 2). The fluidizing air 86 flows upwardly through the gas distributor 63 and counter to the downward flow of the relatively large and intermediate sized dry solids in the downcomer 60 to produce a fluidized bed of the relatively large and intermediate sized dry solids. Due to the difference in densities and size between the relatively large and intermediate sized dry solids, the relatively large dry solids will have a terminal velocity greater than the velocity of the upwardly flowing fluidizing gas 86 and will remain in the fluidized bed. The intermediate sized dry solids will have a terminal velocity less than the velocity of the fluidizing gas 86 and are swept or conveyed out of the downcomer 60 by the conveying gas 84 and pass with the fluidizing gas through the horizontal pipe 62 and are recycled into the reaction zone 15 (FIG. 1) as indicated by the arrow 88 for reuse in reacting with the acid gases contained in the flue gas 11. It will be understood that terminal velocity is the velocity at which the dry solids are entrained in the fluid gas 86 as the dry solids pass through the fluidized bed and into the horizontal pipe 62. Thus, as noted above, the terminal velocity of the intermediate sized particles is less than the velocity of the fluidizing gas 86 and the intermediate sized dry solids become entrained in the fluidizing gas 86 and are presented opposite the inlet 82 whereupon the conveying gas 84 sweeps the intermediate sized dry solids out of the fluidized bed through the horizontal pipe 62 and into the reaction zone 15 (FIG. 1) as indicated by the arrow 88. The relatively large sized dry particles having a terminal velocity as noted above greater than the velocity of the fluidizing gas 86 are not entrained in the fluidizing gas but instead are agitated, kept moving, and remain in the fluidized bed until the slide gate valve 66 is opened and the fluidizing gas 86 shut off whereupon the relatively large sized dry solids will fall downwardly through the bottom of the extended section 64 whose bottom is now open by the slide gate valve 66 and flow into the receiving pipe 67. The slide gate valve 66 is closed to again close the bottom of the lower extended section 64 and the fluidizing gas 86 is turned on again and the fluidizing bed reestablished in the downcomer 60. The slide gate valve 68 is then opened to open the bottom of the receiving pipe 67 to discharge the relatively large sized dry solids from the receiving pipe 67 into the opening 72 of the conveying pipe 70 where the relatively large sized dry solids are discharged as waste.

The separation of the intermediate sized dry solids from the relatively large sized dry solids by the L-valve 46 is done to increase the rate of reaction between the acid gases contained in the flue gas and the absorbing agent, or agents, in the slurry and to increase the amount of absorbing agent, or agents, that are converted to reaction product in the reactor 14. The intermediate sized dry solids react faster than the relatively large sized dry solids, because the reaction occurs on the surface of the solids, and the intermediate sized dry solids have more surface area per unit volume as compared to the relatively large sized dry solids. Faster rates of reaction increase the efficiency at which the absorbing agent, or agents, remove acid gases from the flue gas and increase the rate at which the absorbing agent, or agents, are converted to reaction product thereby increasing the performance and lowering the cost of the apparatus and process of the present invention. Referring again to FIG. 1 and to the bottom portion of the reactor 14, in the event that relatively large sized solids fall out of the rising stream of hot flue gas flowing upwardly through the reaction zone 15, these relatively large sized particles will fall downwardly out of the reactor 14 under the influence of gravity and will fall into the lower duct portion 28 and on top of the normally closed slide gate valve 36. Upon the slide gate valve 36 being periodically opened, such relatively large sized solids will fall into the receiving chamber 38 after which the slide valve gate 36 is closed. Thereafter, the slide gate valve 37 is opened to discharge such relatively large sized solids from the receiving chamber to waste. The waste discharged from the duct 34 and the waste discharged from the L-valve 46 through the pipe 70 shown in FIG. 2 may be used for road fill, sewage sludge stabilizer, neutralizing agent for prevention of acid mine drainage and fertilizer. It will be understood that prior to the flue gas 11 entering the apparatus 10 of the present invention, such flue gas typically passes through an electrostatic precipitator which removes the fly ash from the hot flue gas. Such fly ash removal prevents fly ash from being present in the waste.

Referring further to FIG. 1, it will be further understood that in the present invention the cylinder or reactor 14 may be provided with a second suitable nozzle 90 mounted suitably in the reactor and disposed oppositely to the nozzle 40. The slurry is admitted to nozzle 90 over the line 91 and the stream of high pressure air from the compressor 22 is admitted to the nozzle 90 over the line 92 to atomize the slurry. Such atomization, as described above with regard to the nozzle 40, produces fine droplets of the slurry as shown diagrammatically in the upper portion of the reaction chamber 15. Accordingly, it will be understood that in the present invention the slurry may be introduced co-currently into the rising stream of hot flue gas, introduced counter-currently into the rising stream of hot flue gas, or both.

Referring again to the baghouse 18 of FIG. 1, periodically, a burst or pulse of high pressure air from the air compressor 22 is admitted into the baghouse 18 over the line 43 above the filter bags 18*a* to cause the pulse or burst of high pressure air to expand the bags and dislodge the relatively small sized solids adhering thereto particularly to the outside of the bags. The dislodged relatively small sized solids fall downwardly under the influence of gravity into the L-valve 50. This downward flow of relatively small sized dry solids is indicated by the arrow 94 in FIG. 3 where the L-valve 50 is shown in greater detail.

Figure 3:
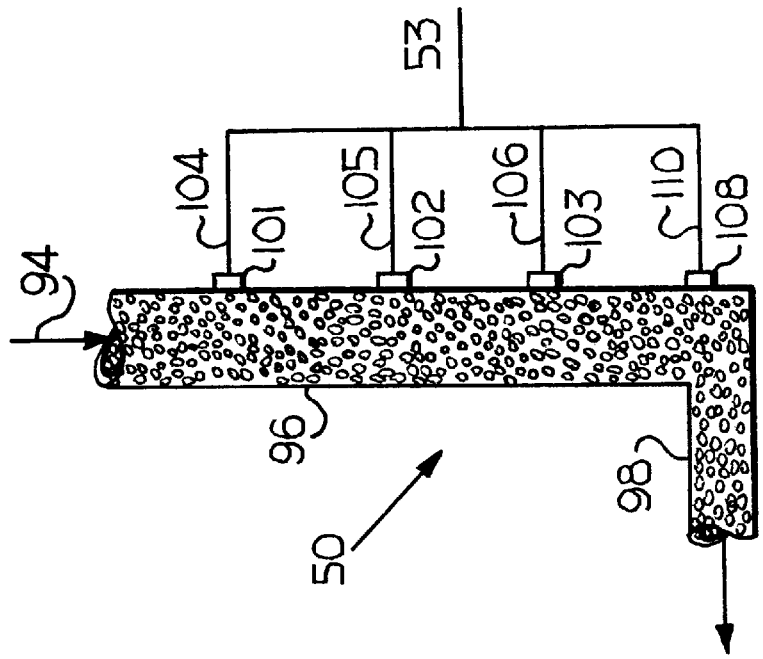
FIG. 3 is a vertical diagrammatical illustration of another L-valve which may be used in the present invention.

The L-valve 50 includes a downcomer 96 in the form of a vertically disposed, hollow, cylindrical pipe which is in flow communication with a horizontally disposed, hollow, cylindrical pipe 98 connected and in flow communication with the lower portion of the downcomer 96. Downcomer 96 is provided with aeration air inlets 101, 102 and 103 for admitting aeration air indicated by the arrows 104, 105 and 106 into the downcomer 96 to agitate the relatively small sized dry solids therein and indicated diagrammatically by the small circles, and to agitate and keep these relatively small sized dry solids moving and flowing continuously downwardly through the downcomer 96 without the formation of bridges or blockages. The downcomer 96 is provided with a further air inlet 108, opposite the horizontal pipe 98 and through which conveying air indicated by the arrow 110 is admitted to convey or transport the relatively small sized particles through the horizontal pipe 98 and into the reactor 14 for recycling and reuse in reacting with the acid gases contained in the flue gas 11. The aeration air 104, 105 and 106 entering the inlets 101, 102 and 103 and the conveying air 110 entering the inlet 108 are provided by the low pressure stream of air from the air compressor 22 over the line 53 (FIGS. 1 and 3).

It will be understood by those skilled in the art that many modifications and variations may be made in the present invention without departing from the spirit and the scope thereof.

What is claimed is:

1. Apparatus for removing acid gases from hot flue gas, comprising:

a first means for providing a reaction zone, said first means including a first inlet for introducing a slurry consisting of water, calcium chloride and at least one absorption agent selected from the group consisting of calcium oxides, magnesium oxides, calcium hydroxides, magnesium hydroxides, alkali metal oxides, alkali metal hydroxides, and alkali metal carbonates, said first means further including a second inlet for introducing the hot flue gas into the reaction zone to provide a rising stream of hot flue gas in the reaction zone, said reaction zone for contacting the rising hot flue gas with the slurry to absorb the acid gas into the water and thereafter to react the acid gas absorbed into the water with the absorption agent and thereafter to evaporate the water within the reaction zone so as to produce dry solids comprising reaction products and unreacted absorption agents suspended in the flue gas and for reducing a water vapor pressure of the slurry in the reaction zone with the calcium chloride contained in the slurry over a water vapor pressure exhibited by the slurry in the absence of the calcium chloride to reduce the rate at which the water evaporates in the reaction zone so as to increase the rate at which the acid gas is absorbed into the water before reacting with the absorption agent, the dry solids including relatively large, relatively small and intermediate sized dry solids, said first means further including a first outlet through which gas including the flue gas having the acid gases substantially removed therefrom and said dry solids exits, and said first means further including a third inlet and a fourth inlet;

a second means for receiving the flue gas containing the dry solids and for separating the relatively large and intermediate sized dry solids from the flue gas;

a third means for receiving the relatively large and intermediate sized dry solids from said second means and for separating the intermediate sized dry solids from the relatively large sized dry solids and for recycling the intermediate sized dry solids to the reaction zone through said third inlet; and a fourth means for receiving the flue gas with the relatively large and intermediate sized dry solids substantially removed therefrom and containing the relatively small sized dry solids and for separating the flue gas and the relatively small sized dry solids and for recycling the relatively small sized dry solids to the reaction zone through said fourth inlet.

2. The apparatus according to claim 1 wherein said first means comprise a vertically oriented cylinder including a lower divergent frustro-conical portion.

3. The apparatus according to claim 1 wherein said second means comprise a separating cyclone.

4. The apparatus according to claim 1 wherein said third means comprise an L-valve.

5. The apparatus according to claim 4 wherein said L-valve comprises a vertically first disposed downcomer for receiving the relatively large and intermediate sized dry solids, a first horizontal pipe extending outwardly from and in flow communication with the first downcomer, said first downcomer including a lower extended section extending downwardly below said horizontal pipe, a gas distributor mounted in said lower extended section of said first downcomer, a second downcomer extending downwardly from said gas distributor internally of said lower extended section, a vertical receiving pipe disposed below said lower extended section of said first downcomer, a second horizontal pipe disposed below said receiving pipe and provided with an opening opposite said receiving pipe, a first slide gate valve disposed between said lower extended section and said receiving pipe and a second slide gate valve disposed between said receiving pipe and said opening of said second horizontal pipe, a plurality of aeration air inlets provided in said first downcomer for admitting aeration air into said first downcomer to agitate the relatively large and intermediate sized dry particles to keep them moving downwardly in said first downcomer, a fluidization air inlet provided in said first downcomer below said gas distributor for admitting fluidization air into said lower extended section of said first downcomer to produce a fluidized bed of the relatively large and intermediate sized dry solids and to entrain the intermediate sized dry solids in the fluidization air and to agitate the relatively large sized dry solids to keep said relatively large sized dry solids moving, a conveying air inlet opposite said first horizontal pipe for admitting conveying air into said first downcomer to convey the entrained intermediate sized dry particles out of said first downcomer and through said first horizontal pipe and into said first means for reuse in reacting with the acid gases.

6. The apparatus according to claim 1 wherein said fourth means comprise a baghouse and an L-valve connected to the bottom of the baghouse.

7. The apparatus according to claim 6 wherein said L-valve comprises a vertically disposed downcomer for receiving the relatively small sized particles, said downcomer including a lower portion, said L-valve further including a horizontally disposed pipe in flow communication with said lower portion of said downcomer, said downcomer provided with a plurality of aeration air inlets for admitting pressurized aeration air into said downcomer to agitate the relatively small sized dry solids to keep said relatively small sized dry solids moving and flowing downwardly through the downcomer, and said downcomer provided with a conveying air inlet opposite said horizontal pipe for admitting conveying air into said downcomer to convey the relatively small sized dry solids through said horizontal pipe and into said first means for reuse in reacting with the acid gases.

* * * * *